United States Patent
Wichman

(10) Patent No.: US 8,631,609 B2
(45) Date of Patent: Jan. 21, 2014

(54) INTEGRAL TRIM TO SEAL OFF WEATHERSTRIP AND REMOVE NEED FOR FOAM PADS

(75) Inventor: Rodney Wichman, Weston, OH (US)

(73) Assignee: Cooper-Standard Automotive Inc., Novi, MI (US)

( * ) Notice: Subject to any disclaimer, the term of this patent is extended or adjusted under 35 U.S.C. 154(b) by 404 days.

(21) Appl. No.: 12/760,025

(22) Filed: Apr. 14, 2010

(65) Prior Publication Data

US 2010/0263294 A1   Oct. 21, 2010

Related U.S. Application Data

(60) Provisional application No. 61/169,790, filed on Apr. 16, 2009.

(51) Int. Cl.
*E06B 7/16* (2006.01)

(52) U.S. Cl.
USPC ....... 49/482.1; 49/479.1; 49/483.1; 49/490.1; 49/440

(58) Field of Classification Search
USPC ............... 49/479.1, 482.1, 483.1, 490.1, 440, 49/377, 372, 374, 496.1
See application file for complete search history.

(56) References Cited

U.S. PATENT DOCUMENTS

| | | | | |
|---|---|---|---|---|
| 4,977,706 A * | 12/1990 | Kisanuki | | 49/479.1 |
| 5,042,201 A * | 8/1991 | Vaughn | | 49/482.1 |
| 5,127,193 A * | 7/1992 | Okada et al. | | 49/495.1 |
| 5,353,549 A * | 10/1994 | Henderson et al. | | 49/490.1 |
| 5,540,477 A * | 7/1996 | Mori | | 296/146.15 |
| 6,070,364 A * | 6/2000 | Berry | | 49/482.1 |
| 6,652,952 B2 * | 11/2003 | Drozd et al. | | 428/122 |
| 6,681,526 B2 * | 1/2004 | Mueller et al. | | 49/440 |
| 6,742,304 B1 * | 6/2004 | Mueller et al. | | 49/377 |
| 2004/0006923 A1 * | 1/2004 | Nakanishi et al. | | 49/502 |
| 2005/0235569 A1 * | 10/2005 | Shumulinskiy | | 49/377 |
| 2006/0150522 A1 * | 7/2006 | Boccuto | | 49/482.1 |
| 2009/0025300 A1 * | 1/2009 | Ho et al. | | 49/483.1 |

* cited by examiner

*Primary Examiner* — Katherine Mitchell
*Assistant Examiner* — Marcus Menezes
(74) *Attorney, Agent, or Firm* — Fay Sharpe LLP

(57) ABSTRACT

A weatherstrip and method of manufacturing an integral close-out or trim to seal off the weatherstrip is disclosed. A notched region in a seal fin accommodates the intersecting weatherstrip. The first seal fin further includes a cut line extending through one end to form the integral close-out. In this manner, separate foam pads typically used to seal along opposite ends of the first weatherstrip can be eliminated, along with the attendant costs associated with material and labor.

20 Claims, 4 Drawing Sheets

INTEGRAL TRIM TO SEAL OFF WEATHERSTRIP AND REMOVE NEED FOR FOAM PADS

This application claims the priority benefit of U.S. Provisional Patent Application Ser. No. 61/169,790, filed Apr. 16, 2009, the disclosure of which is hereby expressly incorporated herein by reference.

BACKGROUND OF THE INVENTION

This application relates to weatherstrip constructions, and more particularly to a first weatherstrip that mates or intersects with a second weatherstrip. This disclosure will be particularly described with reference to an inner belt weatherstrip and the close-out ends of the inner belt weatherstrip at the A- and B-pillars, for example, with a second weatherstrip, such as a glass run. It will be appreciated, however, that the disclosure may be used in similar environments and applications in an effort to remove an additional structure and associated manufacturing process steps.

A typical vehicle includes a number of weatherstrips secured to the vehicle. Included among these weatherstrips are an inner belt and glass run associated with a movable window in a vehicle door. Particularly, the inner belt is usually secured to a door flange located along a periphery of the window opening where the flange is formed by the mating edges of inner and outer door panels. The inner belt includes a generally U-shaped body or mounting portion where generally parallel first and second legs of the U-shape are interconnected along one end by an interconnecting leg. The first and second legs are spaced apart a dimension adapted to closely receive the flange therein. Gripping fingers are usually provided and extend inwardly from at least one of the first and second legs to engage the flange and prevent inadvertent removal of the inner belt.

The inner belt extends along the lower edge of the window opening in the front door between the front or A-pillar and a rear or B-pillar. The same is true of an inner belt situated on the door flange of a rear door where the inner belt extends between the front or B-pillar and a rear or C-pillar. The ends of the inner belt are designed and dimensioned for a close fit with a glass run weatherstrip. The glass run extends along the pillar portions where the glass run is secured to the door and the glass run includes an inwardly facing groove that receives the perimeter edge of the movable window. Lower ends of the glass run extend to the inner belt region, and usually below the inner belt into a cavity in the door defined between the inner and outer door panels.

In prior arrangements, the intersection or junction of the inner belt and glass run weatherstrips required notches to be formed in the opposite ends of the inner belt. Pre-formed or pre-cut foam pads were secured in these notched regions at opposite ends of the inner belt, typically via an adhesive provided on a rear surface on the foam pad to secure the foam pad to the inner belt. This structure necessitated that assemblers add the foam pads to the opposite ends of the inner belt. The foam pads were either applied to the inner belt by the weatherstrip manufacturer or the customer.

Occasionally, a foam pad may fall off the weatherstrip due to one or more conditions, such as handling, environmental conditions, ineffective adhesive, etc. Different proposals have been made to insure the proper amount of pressure is applied to the foam pads. For example, special fixtures have been developed to assure repeatable, consistent application of the foam pads to the weatherstrip.

However, a need exists for an alternative manner of close-out at the intersection of the weatherstrips that is effective, efficient, and conducive to the needs of both the supplier and the customer.

SUMMARY OF THE INVENTION

A weatherstrip used on an associated automotive vehicle includes an elongated body having an elastomeric material that includes a mounting portion for securing the body to the associated vehicle. A first seal fin extends outwardly from the body and has a distal edge spaced from the body. A notch region provided in the first seal fin at one end of the weatherstrip extends inwardly from the distal edge a predetermined dimension and terminates at a location spaced from the body. The notched region is dimensioned to accommodate an associated weatherstrip that intersects at an angle to the elongated body. A cut line extends through a remainder of the first seal fin at the one end of the body to form a close-out.

Preferably, the cut line is substantially aligned with a longitudinal edge of the notched region.

The cut line also extends through a portion of a mounting portion of the body.

A reinforcing member may be included in the body, and often the reinforcing member is metal.

A trim panel receiving portion may also extend outwardly from the body, and may include a portion of the reinforcing member therein.

A close-out extends over a portion of a height of the body and extends outwardly from the body for engagement with a vehicle panel surface.

A method of closing out intersecting first and second weatherstrips where the first weatherstrip includes a U-shaped body having first and second legs for mounting on a vehicle flange, and at least one seal fin extending from the body for engagement with an associated vehicle window, comprises notching a portion of the at least one seal fin at one and of the weatherstrip. Cutting through a remaining portion of the at least one seal fin forms a close out, and includes using the close out to seal against the vehicle.

The method further includes cutting through at least a portion of the first leg of the body.

The method further includes positioning the first and second legs of the body close-out on the same side of the vehicle flange.

The seal fin cutting step includes dimensioning the close-out to match a width of the second weatherstrip.

This disclosure substantially reduces the cost of labor associated with a close-out provided on opposite ends of a weatherstrip.

Another benefit of the disclosure relates to the reduction of material associated with the close-outs on the weatherstrip.

Another advantage is the ability to effectively seal at the junction of first and second weatherstrips.

Still another advantage is the ability to close-out the weatherstrip without a resultant loss in performance with regard to wind noise, water testing, etc. and eliminating the concern relating to separate adhesively secured foam pads.

Still other benefits and advantages of this disclosure will become apparent upon reading and understanding the following detailed description.

DETAILED DESCRIPTION OF THE PREFERRED EMBODIMENT

Figure 1:
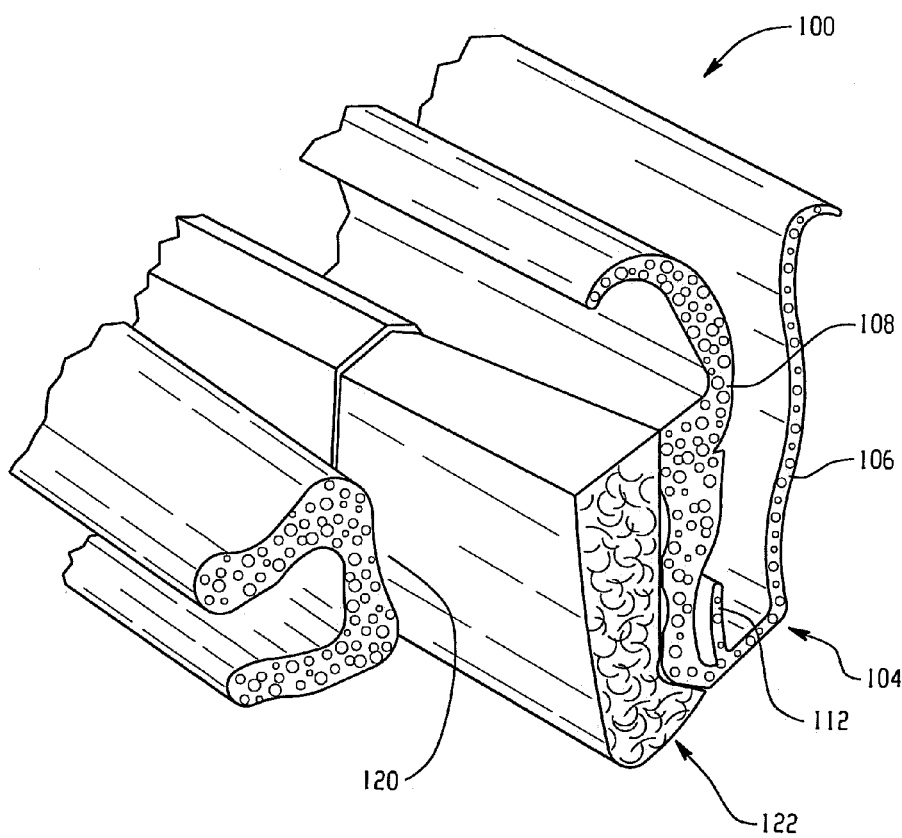
FIG. 1 is a view of a conventional weatherstrip using foam pads at opposite ends of the weatherstrip.

FIG. 1 illustrates a conventional weatherstrip 100 and, as shown here, is an inner belt that is secured to a flange 102 formed by mating edges of inner and outer door panels. The inner belt weatherstrip includes a generally U-shaped body 104 having first and second legs 106, 108 that are interconnected by joining leg 110 to form a generally U-shape. The spacing between the legs 106, 108 approximates that of the flange and one or more gripping fins or fingers 112 extend inwardly from one or both of the legs 106, 108 to engage an external surface of the flange and prevent inadvertent removal of the inner belt weatherstrip. A cutting operation or notching 120 at each end of the weatherstrip was required to allow the inner belt to intersect with a glass run. Typically, the glass run intersected the inner belt at an angle, usually generally perpendicular, to the elongated length of the inner belt. Each notch 120 was designed and dimensioned to receive the glass run weatherstrip. To provide a close fit, pre-formed or pre-cut foam pads 122 were received in the notched regions. The foam pads were adhesively secured along a rear surface of the inner belt. As will be appreciated, a separate notching operation was required to complete the inner belt, and assembly was then further required to secure the foam pads in place on the opposite ends of the inner belt.

Figure 2:
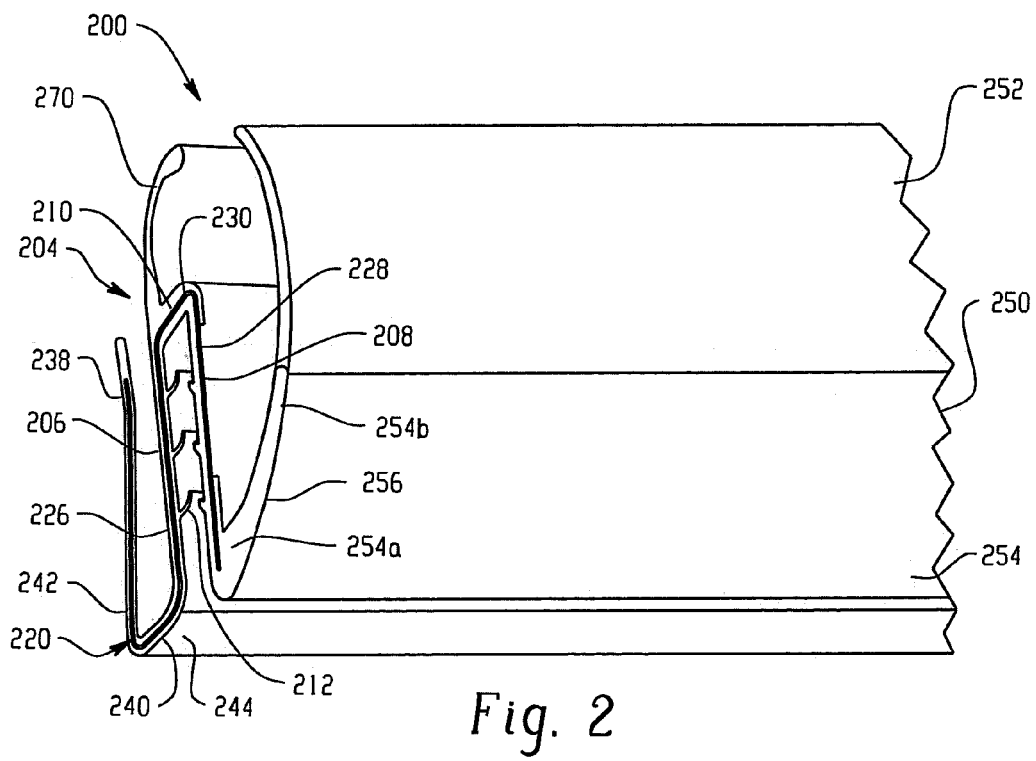
FIG. 2 is a view of the initial preparation steps of the weatherstrip of the present disclosure.

As shown in FIG. 2, elongated weatherstrip 200 still includes a generally U-shaped body 204 for receipt on a door flange (not shown). The body includes first and second legs 206, 208 that are interconnected at one end by a third or interconnecting leg 210. Again, one or more gripping fingers or fins 212 extend inwardly from either one or both of the legs 206, 208. When the weatherstrip is situated over the door flange, the gripping fingers securely grip the external surface of the flange and prevent inadvertent removal of the inner belt weatherstrip from the vehicle.

Oftentimes, the weatherstrip includes a generally rigid core 220. As shown in FIG. 2, the core of the preferred embodiment has a generally S-shape or what would also may be referred to as a pair of inverted, joined U-shaped portions that are joined along a common leg. The first U-shaped portion of the core has portions that correspond to and are received in/encapsulated in the first, second, and interconnecting legs 206, 208, 210. The second portion of the core includes the common leg 226 and a generally parallel leg 238 that are interconnected by core portion 240 in corresponding legs of an inverted U-shaped portion formed by first or common leg 206, second leg 242, and interconnecting, third leg 244. This second portion of the core is intended to secure the trim strip along an interior edge of the window opening in the door.

In addition, first and second seal lips extend from the weatherstrip. The first seal fin or lip 250 includes a flexible thin-walled portion 252, while a second portion 254 of the first seal lip has a generally tapered conformation over its cross-section as the second portion proceeds outwardly from connection with the body (second leg 208) A thicker base region 254a provides a biasing force of the seal lip assembly against a surface of the window. The thinner seal lip portion 254b is more flexible and typically includes a low-friction material 256 that permits a sliding, low friction seal interface with an inner surface of the window. A second seal lip 270 also extends outwardly from the body and serves as a hiding or cover lip to the structure.

Figure 3:
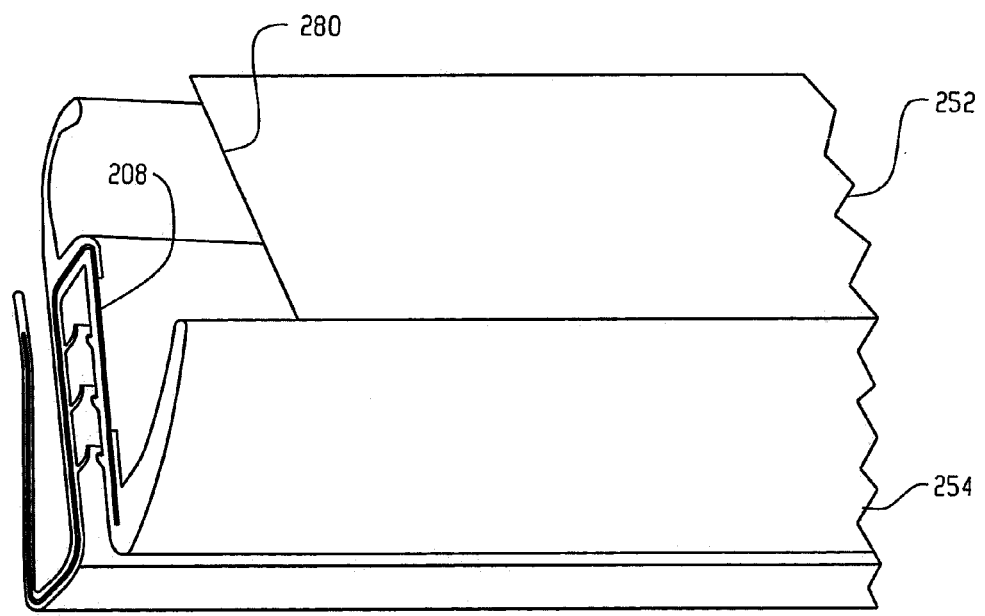
FIG. 3 illustrates cutting or notching of the seal fin.

Turning now to FIG. 3 where many of the reference numerals have been removed from the drawing for ease of illustration and understanding, a notch 280 is formed in the seal lip portion 252. Particularly, the notch is illustrated as a generally rectangular cutout or notched region 280 that preferably terminates at an interface or transition region between the seal lip portions 252, 254, i.e., where the more flexible seal lip portion 252 transitions into the more rigid portion 254. This notch partially exposes a portion of the underlying second leg 208 at each end of the weatherstrip. The notch can be formed in any conventional manner, and preferably the entire notched portion of the seal lip portion 252 is removed as illustrated in FIG. 3.

Figure 4:
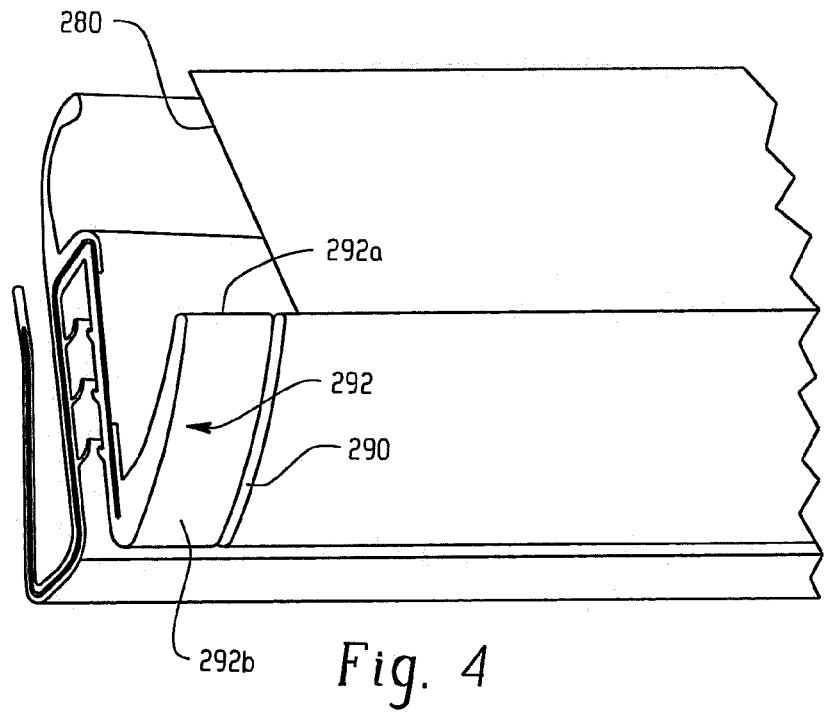
FIG. 4 shows an additional cut along the seal fin to create the close-out.

The next step is to cut through or form a cut line 290 through the seal lip portion 254 as evident in FIG. 4. As shown, the cut line 290 is generally a continuation of the edge of the notch 280, although this need not necessarily be the case. The cut line extending through the seal portion 254 at each end of the body forms a flexible close-out 292 integrated in the seal fin that has a free end 292a and a joined end 292b where the close-out joins with the body, particularly the second leg 208 thereof.

Figure 5:
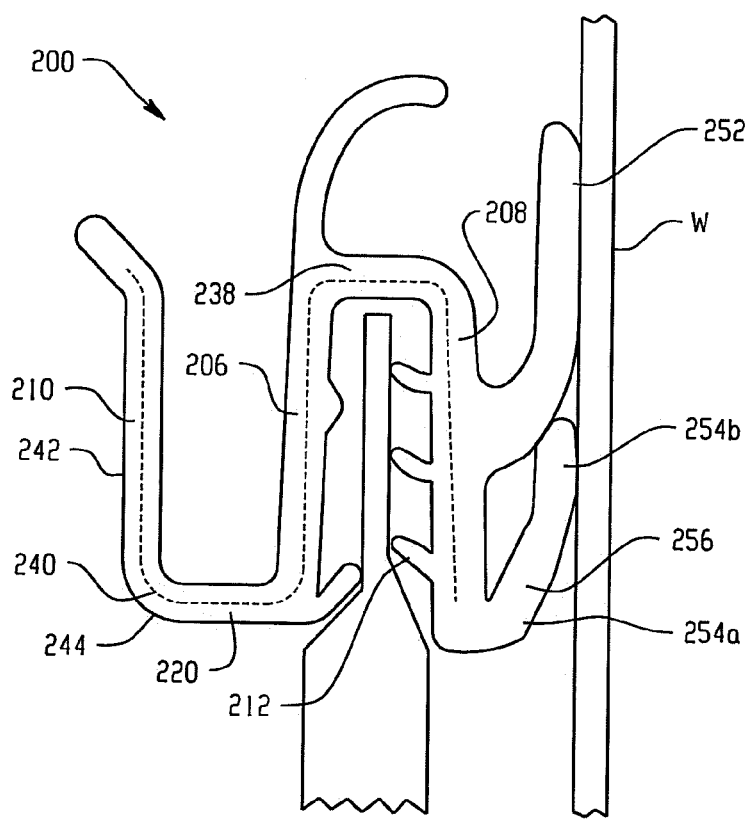
FIG. 5 is a cross-sectional view taken through the weatherstrip at a location in a median portion of the belt.
Figure 6:
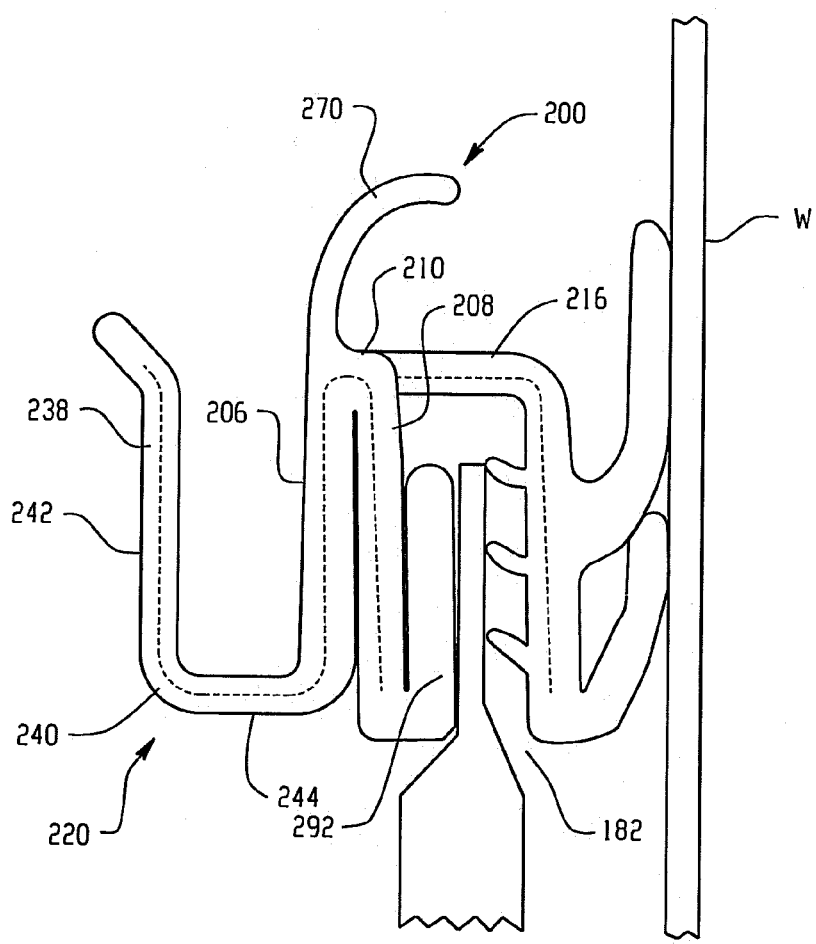
FIG. 6 is a cross-sectional view similar to that of FIG. 5, but taken at the end of the weatherstrip.

A comparison of FIGS. 5 and 6 more particularly illustrates the structure, function and usefulness of the integrated seal fin close-out 292 of the present disclosure. As shown in FIG. 5, the illustrated cross-section is taken through the weatherstrip/inner belt at a location spaced from the notch 280. Thus, the first and second legs 206, 208 are disposed on opposite sides of the door flange, and the first seal 250 is formed such that the seal is biased or directed into sealing engagement with the inner surface of the window W. At the opposite ends, however, and as more particularly shown in FIG. 6, the first leg 206 conforms in mating, abutting relation with the second leg 208 of the body and extends along the same face of the door flange as the second leg. In other words, the first and second legs 206, 208 are disposed in substantially abutting relation and there is no gap between the legs, nor is the door flange received between the legs in the region defining the close-out 292. Moreover, the seal fin close-out 292 is also pressed against an interior surface of the door flange as shown in FIG. 6. This allows the inner belt weatherstrip to accommodate the second weatherstrip, namely the glass run, as the glass run proceeds along the front or rear edge of the window, i.e., along the A- and B-pillars, or B- and C-pillar, locations of a window opening.

In this manner, the glass run and the inner belt weatherstrips easily intersect and no separate seals such as the pre-cut foam pads used in prior arrangements are required. The close-out is an integral trim piece that seals off the weatherstrip and removes the need of a separate component such as foam pads. The integral close-out significantly reduces labor costs, as well as resultant material costs, associated with applying foam pads at opposite ends of an inner belt weatherstrip. It is also believed that the integrated close-out on the weatherstrip seal would be sufficiently flexible to wrap around and mate with the adjacent weatherstrip, i.e., the glass run, to reduce wind noise, road noise, dust intrusion, and eliminate the secondary process and need for an additional component or separate foam pad on the weatherstrip.

Preferably, the close-out fin is a rubber material that has sufficient flexibility and strength for sealing against the door frame. For example, the preferred embodiment uses a 70 durometer rubber. However, it will be appreciated by one skilled in the art that still other materials or different durometer materials can be used to achieve the same sealing strength.

In summary, a weatherstrip includes an elongated body in which a first seal fin extends from the body. A notched region provided in the seal fin at least one end of the body accommodates an associated weatherstrip that intersects at an angle to the elongated body. An integral close-out, formed by a cut line adjacent the notch, extends through a remainder of the first seal fin at the one end of the body. In the preferred arrangement, the cut line is substantially aligned with a longitudinal edge of the notched region, although this need not necessarily be the case.

According to a preferred method of closing out mating first and second elongated weatherstrips, a portion of at least one seal fin of the first weatherstrip is notched. A remaining portion of the at least one seal fin is cut to form a close-out, and the close-out is then used to seal against the vehicle.

The invention has been described with reference to the preferred embodiment. Modifications and alterations will occur to others upon reading and understanding this specification. It is intended to include all such modifications and alterations in so far as they come within the scope of the appended claims or the equivalents thereof

Having thus described the invention, it is now claimed:

1. A weatherstrip for use on an associated vehicle comprising:
   an elongated body having an elastomeric material and including a mounting portion having first and second legs for securing the body to an associated vehicle flange, the body having a median portion between first and second legs;
   a first seal lip extending outwardly from the body and having a distal edge spaced from the body;
   a notched region provided in the first seal lip at at least one end of the body and extending inwardly from the distal edge a predetermined dimension and terminating at a location spaced from the body; and
   a cut line extending through a remainder of the first seal lip at the at least one end of the body to form a close-out lip such that the close-out lip contacts one of the first and second legs of the body mounting portion at the at least one end of the body, when the weatherstrip is mounted to the associated vehicle flange.

2. The weatherstrip of claim 1 wherein the cut line is substantially aligned with a longitudinal edge of the notched region.

3. The weatherstrip of claim 1 further comprising a reinforcing member received in the body.

4. The weatherstrip of claim 3 wherein the reinforcing member is metal.

5. The weatherstrip of claim 3 wherein the body has a generally S-shape.

6. The weatherstrip of claim 5 wherein the generally S-shape includes the reinforcing member.

7. The weatherstrip of claim 1 wherein the close-out lip extends over only a portion of a height of the body.

8. The weatherstrip of claim 1 wherein the close-out lip faces outwardly from the body for engagement with an associated vehicle panel surface.

9. The weatherstrip of claim 1 wherein the mounting portion of the body includes a generally U-shaped member whereby the first and second legs extend therefrom and are dimensioned for receipt on opposite faces of an associated vehicle mounting flange.

10. A belt line weatherstrip mounted on a flange of an associated vehicle comprising:
    an elongated body having an elastomeric material and including first and second mounting legs forming a generally U-shape for securing the body to the associated vehicle flange;
    a seal extending longitudinally along the body, the seal extending outwardly from the body between a first edge joined to the body along one of the mounting legs and a distal edge spaced from the body;
    a notched region formed through only a first portion of the seal along at least one end of the body, the notched region extending a predetermined dimension from the distal edge toward the first edge to form a seal second portion joined to the body along the first edge; and
    a close-out lip defined by a cut line extending through at least a portion of the seal second portion so that the close-out lip is hingedly connected to the body along the first edge and along at least one end of the body, the first and second mounting legs contacting one another adjacent to the close-out lip at the at least one end of the body when the weatherstrip is mounted to the associated vehicle flange.

11. The weatherstrip of claim 10 wherein the cut line is substantially aligned with a longitudinal edge of the notched region.

12. The weatherstrip of claim 10 further comprising a reinforcing member received in the body.

13. The weatherstrip of claim 12 wherein the reinforcing member is metal.

14. The weatherstrip of claim 12 wherein the body further includes a trim panel receiving portion.

15. The weatherstrip of claim 14 wherein the trim panel receiving portion includes the reinforcing member.

16. The weatherstrip of claim 10 wherein the close-out lip extends over only a portion of a height of the body.

17. The weatherstrip of claim 10 wherein the close-out lip faces outwardly from the body for engagement with an associated vehicle panel surface.

18. The weatherstrip of claim 10 wherein the mounting legs of the body member are dimensioned for receipt on opposite faces of an associated vehicle mounting flange.

19. The weatherstrip of claim 10 wherein the close-out lip, and first and second mounting legs are all disposed on a first side of the vehicle flange adjacent the notched region.

20. A weatherstrip for use on an associated vehicle comprising:
    an elongated body having an elastomeric material and including a mounting portion for securing the body to an associated vehicle;
    a first seal lip having a first edge joined to the body, the first seal lip extending outwardly from the body and having a distal edge spaced from the body;
    a notched region provided in the first seal lip at one end of the body and extending inwardly from the distal edge a predetermined dimension and terminating at a location spaced from the first edge joined to the body; and
    a cut line extending through a remainder of the first seal lip at the one end of the body to form a close-out lip that is hingedly connected to the body along the first edge, and along at least one end of the body, the close-out lip and mounting portion contacting one another at the at least one end of the body when the weatherstrip is mounted to a flange on the associated vehicle.

* * * * *